(12) United States Patent
Chan

(10) Patent No.: US 11,114,942 B2
(45) Date of Patent: Sep. 7, 2021

(54) BOOST CONVERTER

(71) Applicant: Acer Incorporated, New Taipei (TW)

(72) Inventor: Tzu-Tseng Chan, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 16/826,462

(22) Filed: Mar. 23, 2020

(65) Prior Publication Data

US 2021/0135573 A1 May 6, 2021

(30) Foreign Application Priority Data

Oct. 31, 2019 (TW) ................................ 108139443

(51) Int. Cl.
*H02M 3/158* (2006.01)
(52) U.S. Cl.
CPC .................................. *H02M 3/158* (2013.01)
(58) Field of Classification Search
CPC .................................................... H02M 3/158
See application file for complete search history.

(56) References Cited

U.S. PATENT DOCUMENTS

| | | | | |
|---|---|---|---|---|
| 5,532,919 A * | 7/1996 | Gegner | .................. | H02M 3/158 363/124 |
| 5,543,704 A * | 8/1996 | Thoren | .................. | H02M 3/158 323/222 |
| 5,594,635 A * | 1/1997 | Gegner | .................. | H02M 3/337 363/124 |
| 5,636,114 A * | 6/1997 | Bhagwat | .................. | H02M 1/44 363/56.12 |
| 5,923,153 A * | 7/1999 | Liu | ........................ | H02M 3/158 323/222 |
| 5,991,174 A * | 11/1999 | Farrington | ......... | H03K 17/0814 363/56.11 |
| 6,236,191 B1 * | 5/2001 | Chaffai | .................. | H02M 3/158 323/225 |
| 2006/0262577 A1 * | 11/2006 | Schenk | .................. | H02M 1/34 363/50 |
| 2010/0061122 A1 * | 3/2010 | Okubo | .................. | H02M 3/158 363/20 |
| 2015/0171729 A1 * | 6/2015 | Scandola | .............. | H02M 3/158 363/21.02 |
| 2018/0019660 A1 * | 1/2018 | Jang | ....................... | H02M 3/158 |
| 2018/0316256 A1 * | 11/2018 | Cyr | ....................... | H02M 1/088 |
| 2019/0181743 A1 * | 6/2019 | Vangala | ............. | H02M 3/33507 |
| 2020/0076301 A1 * | 3/2020 | Zhuang | .................. | H02M 1/32 |

* cited by examiner

*Primary Examiner* — Rafael O De Leon Domenech
(74) *Attorney, Agent, or Firm* — McClure, Qualey & Rodack, LLP

(57) ABSTRACT

A boost converter includes a first inductor, a power switch element, an output stage circuit, a controller, a resonant circuit, and a discharging circuit. The first inductor receives an input voltage. The power switch element includes a parasitic capacitor. The output stage circuit includes a first resistor. The output stage circuit generates an output voltage. The controller detects the resistive voltage of the first resistor, and generates a clock voltage, a first control voltage, and a second control voltage according to the resistive voltage. The resonant circuit is coupled to the first inductor, and is selectively enabled or disabled according to the first control voltage. When the resonant circuit is enabled, the resonant circuit resonates with the first inductor and the parasitic capacitor, so as to fine-tune an inductive current flowing through the first inductor.

15 Claims, 5 Drawing Sheets

BOOST CONVERTER

CROSS REFERENCE TO RELATED APPLICATIONS

This Application claims priority of Taiwan Patent Application No. 108139443 filed on Oct. 31, 2019, the entirety of which is incorporated by reference herein.

BACKGROUND OF THE INVENTION

Field of the Invention

The disclosure generally relates to a boost converter, and more specifically, to a boost converter with high output efficiency.

Description of the Related Art

In a conventional boost converter, a boost inductor tends to resonate with a parasitic capacitor of a power switch element, thereby generating a reverse inductive current. Such a reverse inductive current may cause power consumption in the form of heat energy (referred to hereinafter as "heat consumption"), which can affect the output efficiency of the boost converter. Accordingly, there is a need to propose a novel solution for solving the problems of the prior art.

BRIEF SUMMARY OF THE INVENTION

In a preferred embodiment, the invention is directed to a boost converter that includes a first inductor, a power switch element, an output stage circuit, a controller, a resonant circuit, and a discharging circuit. The first inductor receives an input voltage. The power switch element includes a parasitic capacitor. The power switch element determines whether to couple the first inductor to a ground voltage according to a clock voltage. The output stage circuit includes a first resistor, and is coupled to the first inductor and the power switch element. The output stage circuit generates an output voltage. The controller detects the resistive voltage of the first resistor, and generates a clock voltage, a first control voltage, and a second control voltage according to the resistive voltage. The resonant circuit is coupled to the first inductor, and is selectively enabled or disabled according to the first control voltage. The discharging circuit determines whether to couple the resonant circuit to the ground voltage according to the second control voltage. When the resonant circuit is enabled, the resonant circuit resonates with the first inductor and the parasitic capacitor, so as to fine-tune an inductive current flowing through the first inductor.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the purposes, features and advantages of the invention, the embodiments and figures of the invention are described in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

Figure 1:
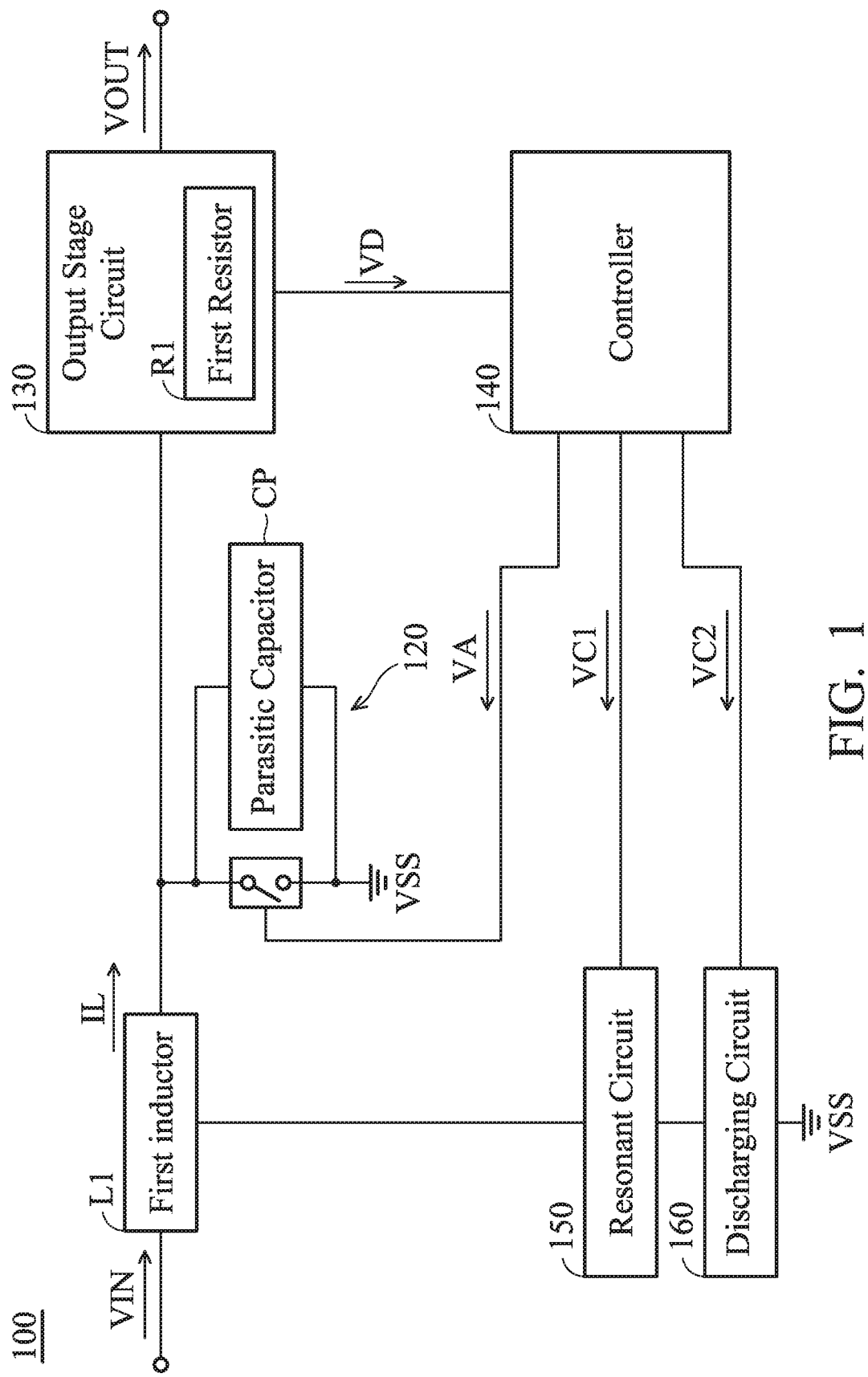
FIG. 1 is a diagram of a boost converter according to an embodiment of the invention.

FIG. 1 is a diagram of a boost converter 100 according to an embodiment of the invention. The boost converter 100 may be applied to a mobile device, such as a desktop computer, a notebook computer, or an all-in-one computer. As shown in FIG. 1, the boost converter 100 includes a first inductor L1, a power switch element 120, an output stage circuit 130, a controller 140, a resonant circuit 150, and a discharging circuit 160. The power switch element 120 includes a parasitic capacitor C1. The output stage circuit 130 includes a first resistor R1. It should be noted that the boost converter 100 may further include other components, such as a voltage regulator and/or a negative feedback circuit, although they are not displayed in FIG. 1.

The first inductor L1 is considered as a boost inductor of the boost converter 100. The first inductor L1 is configured to receive an input voltage VIN. The input voltage VIN may be from an external power source. The input voltage VIN may be an AC (Alternating Current) voltage with any frequency and any magnitude. For example, the frequency of the AC voltage may be about 50 Hz or 60 Hz, and the RMS (Root-Mean-Square) value of the AC voltage may be about 110V or 220V, but they are not limited thereto. The power switch element 120 determines whether to couple the first inductor L1 to a ground voltage VSS (e.g., 0V) according to a clock voltage VA. For example, if the clock voltage VA has a high logic level (e.g., logic "1"), the power switch element 120 may couple the first inductor L1 to the ground voltage VSS (i.e., the power switch element 120 may almost be a short-circuited path). Conversely, if the clock voltage VA has a low logic level (e.g., logic "0"), the power switch element 120 may not couple the first inductor L1 to the ground voltage VSS (i.e., the power switch element 120 may almost be an open-circuited path). The total parasitic capacitance between two terminals of the power switch element 120 is modeled as the aforementioned parasitic capacitor CP, which is not an independent external component. The output stage circuit 130 is coupled to the first inductor L1 and the power switch element 120. The output stage circuit 130 is configured to generate an output voltage VOUT. The output voltage VOUT may be a DC (Direct Current) voltage. The voltage level of the output voltage VOUT may be higher than the maximum value of the input voltage VIN. The first resistor R1 of the output stage circuit 130 is considered as a detection resistor. The controller 140 may be an IC (Integrated Circuit) chip. The controller 140 detects a resistive voltage VD of the first resistor R1. The controller 140 generates the clock voltage VA, a first control voltage VC1, and a second control voltage VC2 according to the resistive voltage VD. For example, when the boost converter 100 is initialized, the clock voltage VA may be maintained at a constant voltage. When the boost converter 100 is operating normally, the clock voltage VA can provide a periodical clock waveform. The resonant circuit 150 is coupled to the first inductor L1. The resonant circuit 150 is selectively enabled or disabled according to the first control voltage VC1. For example, if the first control voltage VC1 has a high logic level, the resonant circuit 150 may be enabled, and conversely, if the first control voltage VC1 has a low logic level, the resonant circuit 150 may be disable. The discharging circuit 160 determines whether to couple the resonant circuit 150 to the ground voltage VSS according to the second control voltage VC2. For example, if the second control voltage VC2 has a high logic level, the discharging circuit 160 may couple the resonant circuit 150 to the ground voltage VSS (i.e., the discharging circuit 160 may almost be a short-circuited path). Conversely, if the second control voltage VC2 has a low logic level, the discharging circuit 160 may not couple the resonant circuit 150 to the ground voltage VSS (i.e., the discharging circuit 160 may almost be an open-circuited path). It should be noted that when the resonant circuit 150 is enabled, the resonant circuit 150 resonates with the first inductor L1 and the parasitic capacitor CP, so as to fine-tune an inductive current IL flowing through the first inductor L1. According to practical measurements, such a circuit design can prevent the first inductor L1 of the boost converter 100 from having heat consumption due to a non-ideal reverse current, thereby increasing output efficiency of the boost converter 100.

The following embodiments will introduce the detailed structure and operation of the boost converter 100. It should be understood these figures and descriptions are merely exemplary, rather than limitations of the invention.

Figure 2:
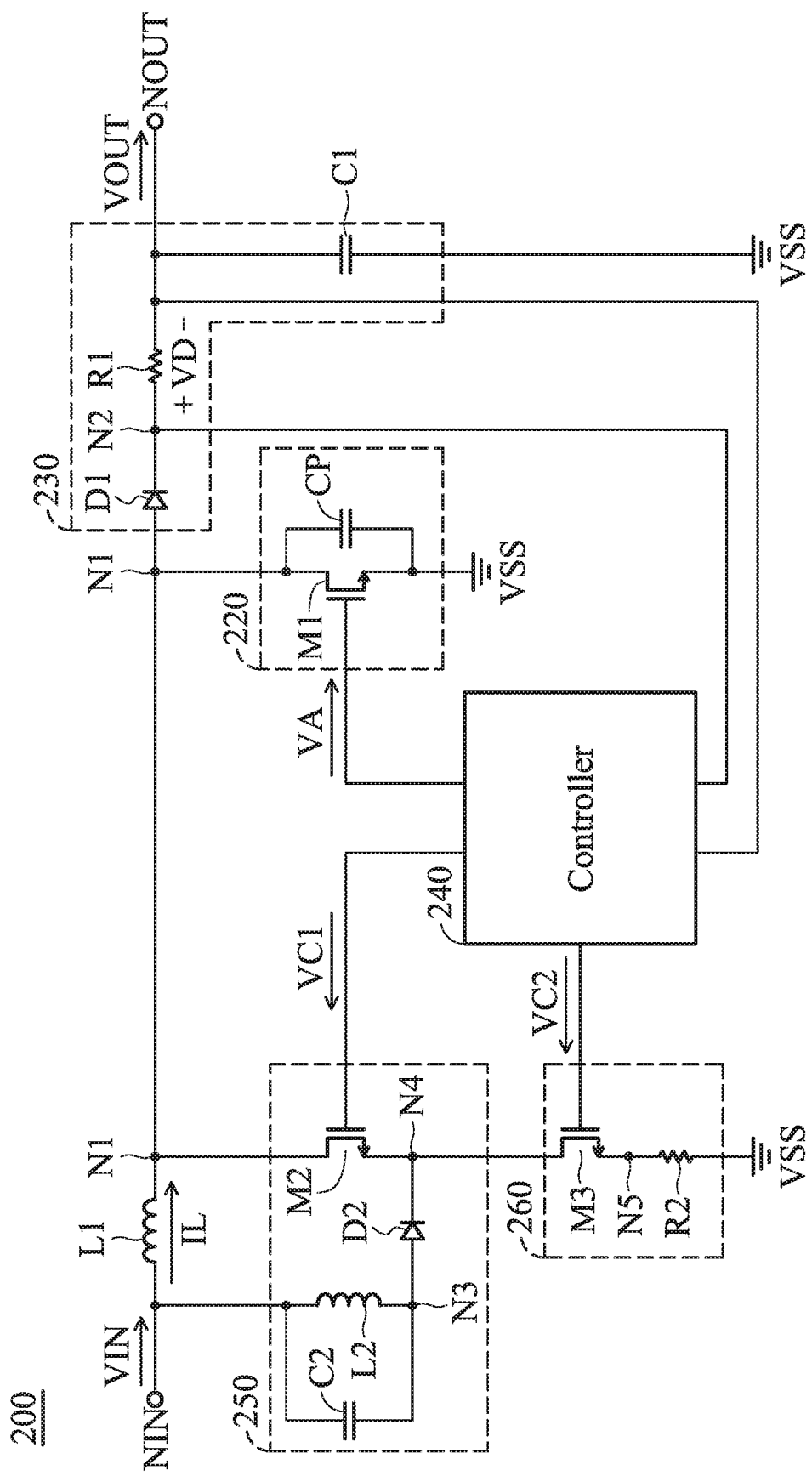
FIG. 2 is a diagram of a boost converter according to an embodiment of the invention.

FIG. 2 is a diagram of a boost converter 200 according to an embodiment of the invention. In the embodiment of FIG. 2, the boost converter 200 with an input node NIN and an output node NOUT includes a first inductor L1, a power switch element 220, an output stage circuit 230, a controller 240, a resonant circuit 250, and a discharging circuit 260. The power switch element 220 includes a parasitic capacitor C1. The output stage circuit 230 includes a first resistor R1. The input node NIN of the boost converter 200 is arranged for receiving an input voltage VIN from an external power source. The output node NOUT of the boost converter 200 is arranged for outputting an output voltage VOUT. The voltage level of the output voltage VOUT may be higher than the maximum value of the input voltage VIN.

The first inductor L1 has a first terminal coupled to an input node NIN, and a second terminal coupled to the first node N1. An inductive current IL flows from the input node NIN through the first inductor L1 to the first node N1.

The power switch element 220 includes a first transistor M1. The first transistor M1 may be an NMOS transistor (N-type Metal Oxide Semiconductor Field Effect Transistor). The first transistor M1 has a control terminal for receiving a clock voltage VA, a first terminal coupled to a ground voltage VSS, and a second terminal coupled to a first node N1. The total parasitic capacitance between the first terminal and the second terminal of the first transistor M1 is modeled as the aforementioned parasitic capacitor CP, which is not an independent external component. The parasitic capacitor CP has a first terminal coupled to the first node N1, and a second terminal coupled to the ground voltage VSS.

In addition to the first resistor R1, the output stage circuit 230 further includes a first diode D1 and a first capacitor C1. The first diode D1 has an anode coupled to the first node N1, and a cathode coupled to a second node N2. The first resistor R1 has a first terminal coupled to the second node N2, and a second terminal coupled to the output node NOUT. The first capacitor C1 has a first terminal coupled to the output node NOUT, and a second terminal coupled to the ground voltage VSS.

The controller 240 is coupled to the second node N2 and the output node NOUT, so as to detect a resistive voltage VD of the first resistor R1. The resistive voltage VD may be substantially equal to the voltage difference between the first terminal and the second terminal of the first resistor R1. The controller 240 generates the clock voltage VA, a first control voltage VC1, and a second control voltage VC2 according to the resistive voltage VD. For example, when the boost converter 200 is initialized, the clock voltage VA may be maintained at a constant voltage (e.g., the ground voltage VSS). When the boost converter 200 is operating normally, the clock voltage VA can provide a periodical clock waveform. Furthermore, except for the initial stage, the waveform of the second control voltage VC2 may be almost the same as the waveform of the clock voltage VA.

Figure 3:
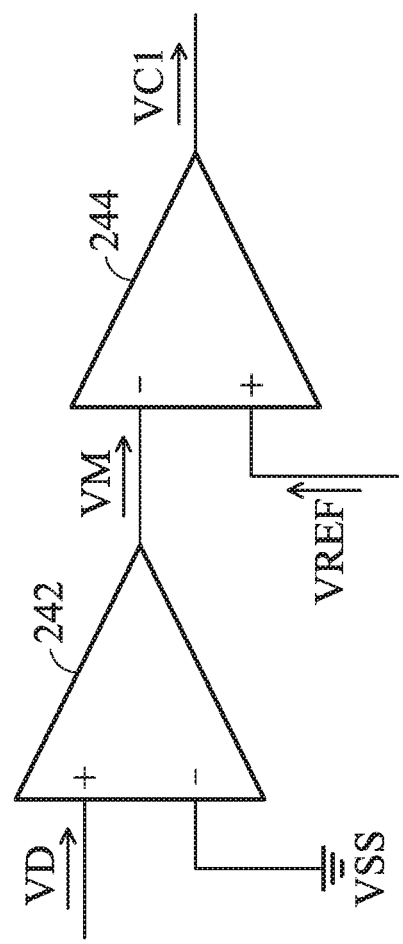
FIG. 3 is a diagram of a controller according to an embodiment of the invention.

FIG. 3 is a diagram of a controller 240 according to an embodiment of the invention. FIG. 3 displays at least one portion of the circuit of the controller 240. In the embodiment of FIG. 3, the controller 240 includes a first comparator 242 and a second comparator 244. For example, any of the first comparator 242 and the second comparator 244 may be implemented with an error amplifier or an operational amplifier, but it is not limited thereto. The first comparator 242 has a positive input terminal for receiving the resistive voltage VD, a negative input terminal coupled to the ground voltage VSS, and an output terminal for outputting a comparison voltage VM. For example, if the resistive voltage VD is higher than the ground voltage VSS, the comparison voltage VM may have a high logic level. Conversely, if the resistive voltage VD is lower than or equal to the ground voltage VSS, the comparison voltage VM may have a low logic level. The second comparator 244 has a positive input terminal for receiving a reference voltage VREF, a negative input terminal coupled for receiving the comparison voltage VM, and an output terminal for outputting the first control voltage VC1. For example, if the reference voltage VREF is higher than the comparison voltage VM, the first control voltage VC1 may have a high logic level. Conversely, if the reference voltage VREF is lower than or equal to the comparison voltage VM, the first control voltage VC1 may have a low logic level. In alternative embodiments, the controller 240 further includes other components, such as a clock generator (not shown), but it is not limited thereto.

The resonant circuit 250 includes a second capacitor C2, a second inductor L2, a second diode D2, and a second transistor M2. The second capacitor C2 has a first terminal coupled to the input node NIN, and a second terminal coupled to a third node N3. The second inductor L2 has a first terminal coupled to the input node NIN, and a second terminal coupled to the third node N3. The second diode D2 has an anode coupled to the third node N3, and a cathode coupled to a fourth node N4. The second transistor M2 may be an NMOS transistor. The second transistor M2 has a control terminal for receiving the first control voltage VC1, a first terminal coupled to the fourth node N4, and a second terminal coupled to the first node N1.

The discharging circuit 260 includes a third transistor M3 and a second resistor R2. The third transistor M3 may be an NMOS transistor. The third transistor M3 has a control terminal for receiving the second control voltage VC2, a first terminal coupled to a fifth node N5, and a second terminal coupled to the fourth node N4. The second resistor R2 has a first terminal coupled to the fifth node N5, and a second terminal coupled to the ground voltage VSS.

In some embodiments, the operation principles of the boost converter 200 are described as follows. The boost converter 200 can sequentially operate in a first state, a second state, a third state, and a fourth state one after another. First of all, in the first state, no energy is input to the input node NIN, and the clock voltage VA is maintained at the ground voltage VSS. At this time, the first transistor M1, the second transistor M2, and the third transistor M3 are all disabled.

In the second state, the input voltage VIN becomes a positive voltage, and the clock voltage VA is within a periodical high-logic interval, rather than being equal to the ground voltage VSS. At this time, the first transistor M1 is enabled, but the second transistor M2 and the third transistor M3 are both disabled. Furthermore, the inductive current IL flowing through the first inductor L1 gradually becomes higher.

Figure 4:
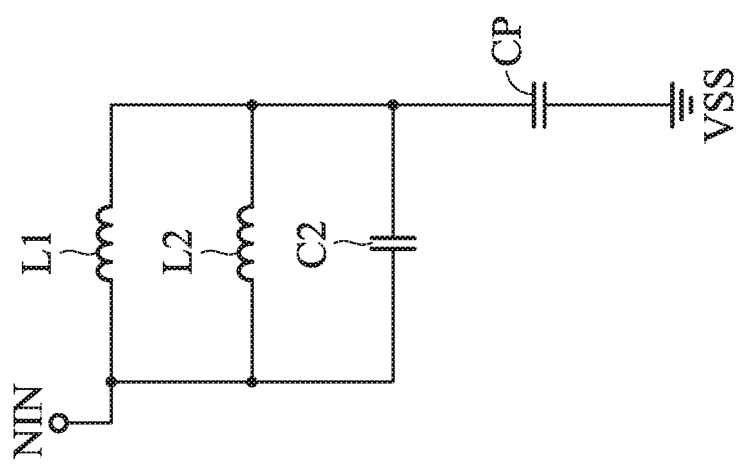
FIG. 4 is a diagram of an equivalent circuit of a boost converter operating in a third state according to an embodiment of the invention.

FIG. 4 is a diagram of an equivalent circuit of the boost converter 200 operating in the third state according to an embodiment of the invention. In the third state, the clock voltage VA is within a periodical low-logic interval. At this time, the first transistor M1 is disabled, the first diode D1 is turned on, and the inductive current IL flowing through the first inductor L1 and the first diode D1 gradually becomes lower. When the resistive voltage VD of the first resistor R1 falls to 0, the comparison voltage VM becomes a low logic level, and the first control voltage VC1 becomes a high logic level, so as to enable the second transistor M2 and the resonant circuit 250. Thus, the second capacitor C2 and the second inductor L2 resonate with the first inductor L1 and the parasitic capacitor CP (as shown in FIG. 4), so as to fine-tune the inductive current IL flowing through the first inductor L1.

Figure 5:
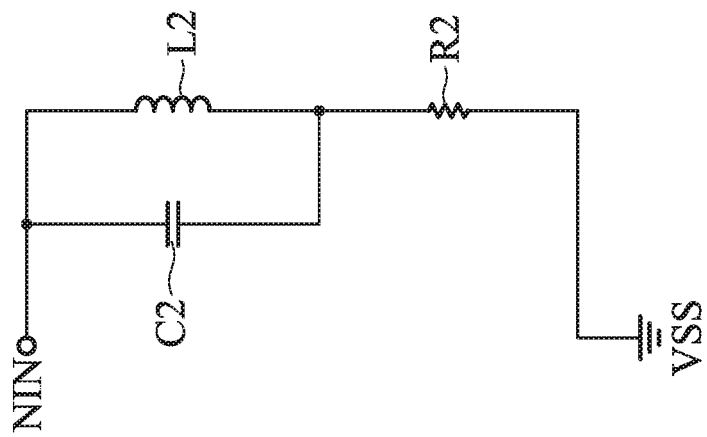
FIG. 5 is a diagram of an equivalent circuit of a boost converter operating in a fourth state according to an embodiment of the invention.

FIG. 5 is a diagram of an equivalent circuit of the boost converter 200 operating in the fourth state according to an embodiment of the invention. In the fourth state, the clock voltage VA is within a periodical high-logic interval. At this time, the first transistor M1 is enabled, and the first diode D1 is turned off. Since the second control voltage VC2 substantially follows the clock voltage VA, the second control voltage VC2 becomes a high logic level, so as to enable the third transistor M3 and the discharging circuit 260. Thus, the energy stored in the second capacitor C2 and the second inductor L2 can be released through the second resistor R2 to the ground voltage VSS (as shown in FIG. 5). Finally, the boost converter 200 may operate in the third state and the fourth state alternatively and repeatedly, and it is considered as a normal operation state of the boost converter 200.

Figure 6:
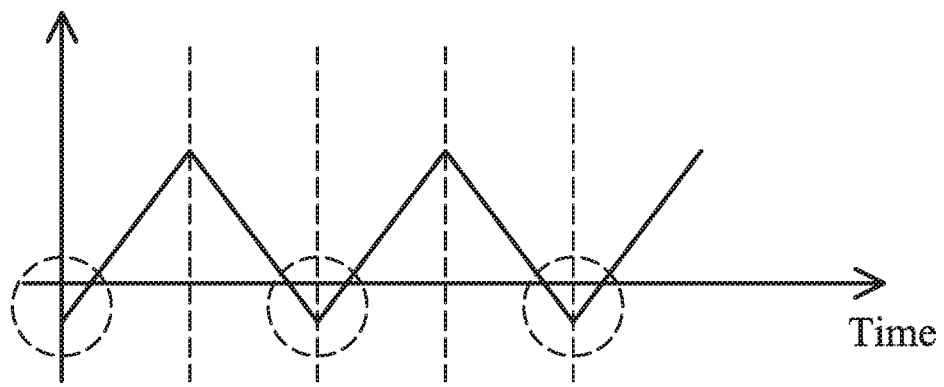
FIG. 6 is a diagram of a waveform of an inductive current of a conventional boost converter.
Figure 7:
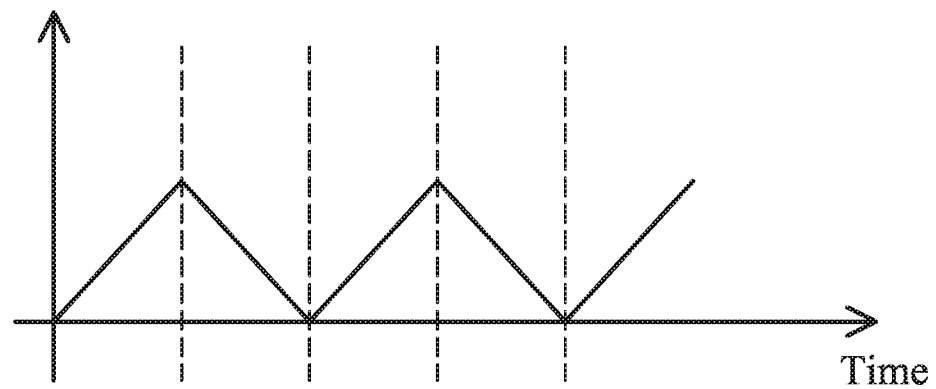
FIG. 7 is a diagram of a waveform of an inductive current of a boost converter according to an embodiment of the invention.

FIG. 6 is a diagram of a waveform of an inductive current of a conventional boost converter. As shown in FIG. 6, the inductive current of the conventional boost converter has some non-ideal reverse portions (as shown in a dotted-line box), and they cause undesired heat consumption. FIG. 7 is a diagram of a waveform of the inductive current IL of the boost converter 200 according to an embodiment of the invention. According to the practical measurement of FIG. 7, after the proposed resonant circuit 250 and discharging circuit 260 are used, the boost converter 200 of the invention can generate the inductive current IL without any reverse portions. Such a design not only reduces the heat consumption but also significantly increases the output efficiency of the boost converter 200.

In some embodiments, the element parameters of the boost converter 200 are described as follows. The inductance of the first inductor L1 may be from 570 μH to 630 μH, such as 600 μF. The inductance of the second inductor L2 may be from 95 μH to 105 μH, such as 100 μF. The capacitance of the first capacitor C1 may be from 2400 μF to 3600 μF, such as 3000 μF. The capacitance of the second capacitor C2 may be from 64.6 nF to 71.4 nF, such as 68 nF. The resistance of the first resistor R1 may be from 9.9 mΩ to 10.1 mΩ, such as 10 mΩ. The resistance of the second resistor R2 may be from 0.95 kΩ to 1.05 kΩ, such as 1 kΩ. The reference voltage VREF may be about 0.5V. The switching frequency of the clock voltage VA may be about 65 kHz. The above ranges of parameters are calculated and obtained according to the results of many experiments, and they help to optimize the transformation efficiency of the boost converter 200.

The invention proposes a novel boost converter which includes a resonant circuit and a discharging circuit. According to practical measurements, the boost converter using the aforementioned design can significantly reduce the non-ideal reverse inductive current. Generally, the invention can effectively increase the output efficiency of the boost converter, and it is suitable for application in a variety of electronic devices.

Note that the above voltages, currents, resistances, inductances, capacitances and other element parameters are not limitations of the invention. A designer can adjust these parameters according to different requirements. The boost converter of the invention is not limited to the configurations of FIGS. 1-7. The invention may merely include any one or more features of any one or more embodiments of FIGS. 1-7. In other words, not all of the features displayed in the figures should be implemented in the boost converter of the invention. Although the embodiments of the invention use MOSFET as examples, the invention is not limited thereto, and those skilled in the art may use other types of transistors, such as BJT (Bipolar Junction Transistor), JFET (Junction Gate Field Effect Transistor), FinFET (Fin Field Effect Transistor), etc., without affecting the performance of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention.

It is intended that the standard and examples be considered exemplary only, with a true scope of the disclosed embodiments being indicated by the following claims and their equivalents.

What is claimed is:

1. A boost converter, comprising:
   a first inductor, receiving an input voltage;
   a power switch element, comprising a parasitic capacitor, wherein the power switch element determines whether to couple the first inductor to a ground voltage according to a clock voltage;
   an output stage circuit, comprising a first resistor, and coupled to the first inductor and the power switch element, wherein the output stage circuit generates an output voltage;
   a controller, detecting a resistive voltage of the first resistor, and generating the clock voltage, a first control voltage, and a second control voltage according to the resistive voltage;
   a resonant circuit, coupled to the first inductor, and selectively enabled or disabled according to the first control voltage; and
   a discharging circuit, determining whether to couple the resonant circuit to the ground voltage according to the second control voltage;
   wherein when the resonant circuit is enabled, the resonant circuit resonates with the first inductor and the parasitic capacitor, so as to fine-tune an inductive current flowing through the first inductor.

2. The boost converter as claimed in claim 1, wherein the power switch circuit comprises:
   a first transistor, wherein the first transistor has a control terminal for receiving the clock voltage, a first terminal coupled to the ground voltage, and a second terminal coupled to a first node.

3. The boost converter as claimed in claim 2, wherein the first inductor has a first terminal coupled to an input node for receiving the input voltage, and a second terminal coupled to the first node, and wherein the parasitic capacitor has a first terminal coupled to the first node, and a second terminal coupled to the ground voltage.

4. The boost converter as claimed in claim 3, wherein the output stage circuit further comprises:
   a first diode, wherein the first diode has an anode coupled to the first node, and a cathode coupled to a second node; and
   a first capacitor, wherein the first capacitor has a first terminal coupled to an output node for outputting the output voltage, and a second terminal coupled to the ground voltage;
   wherein the first resistor has a first terminal coupled to the second node, and a second terminal coupled to the output node.

5. The boost converter as claimed in claim 4, wherein the controller is coupled to the second node and the output node so as to detect the resistive voltage, and the resistive voltage is equal to a voltage difference between the first terminal and the second terminal of the first resistor.

6. The boost converter as claimed in claim 3, wherein the resonant circuit comprises:
   a second capacitor, wherein the second capacitor has a first terminal coupled to the input node, and a second terminal coupled to a third node.

7. The boost converter as claimed in claim 6, wherein the resonant circuit further comprises:
   a second inductor, wherein the second inductor has a first terminal coupled to the input node, and a second terminal coupled to the third node.

8. The boost converter as claimed in claim 7, wherein the resonant circuit further comprises:
   a second diode, wherein the second diode has an anode coupled to the third node, and a cathode coupled to a fourth node.

9. The boost converter as claimed in claim 8, wherein the resonant circuit further comprises:
   a second transistor, wherein the second transistor has a control terminal for receiving the first control voltage, a first terminal coupled to the fourth node, and a second terminal coupled to the first node.

10. The boost converter as claimed in claim 9, wherein the discharging circuit further comprises:
    a third transistor, wherein the third transistor has a control terminal for receiving the second control voltage, a first terminal coupled to a fifth node, and a second terminal coupled to the fourth node; and
    a second resistor, wherein the second resistor has a first terminal coupled to the fifth node, and a second terminal coupled to the ground voltage.

11. The boost converter as claimed in claim 1, wherein the controller comprises:
    a first comparator, wherein the first comparator has a positive input terminal for receiving the resistive voltage, a negative input terminal coupled to the ground voltage, and an output terminal for outputting a comparison voltage.

12. The boost converter as claimed in claim 11, wherein the controller further comprises:
    a second comparator, wherein the second comparator has a positive input terminal for receiving a reference voltage, a negative input terminal coupled for receiving the comparison voltage, and an output terminal for outputting the first control voltage.

13. The boost converter as claimed in claim 12, wherein the reference voltage is about 0.5V.

14. The boost converter as claimed in claim 12, wherein a switching frequency of the clock voltage is about 65 kHz.

15. The boost converter as claimed in claim 12, wherein a waveform of the second control voltage is almost the same as that of the clock voltage.

* * * * *